United States Patent [19]

Mobasser

[11] Patent Number: 5,289,463
[45] Date of Patent: Feb. 22, 1994

[54] METHOD OF MANAGING FLOWS IN A WIDEBAND INTEGRATED SERVICES DIGITAL TELECOMMUNICATIONS NETWORK

[75] Inventor: Bahman Mobasser, Maurepas, France

[73] Assignee: Alcatel Cit, Paris, France

[21] Appl. No.: 888,807

[22] Filed: May 27, 1992

[30] Foreign Application Priority Data

May 30, 1991 [FR] France .................. 91 06520

[51] Int. Cl.$^5$ .......................... H04J 1/00; H04J 3/12; H04Q 11/04
[52] U.S. Cl. .............................. 370/68.1; 370/58.2; 370/110.1
[58] Field of Search .................. 370/58.2, 58.3, 60, 370/60.1, 61, 68.1, 94.1, 95.1, 110.1, 58.1

[56] References Cited

FOREIGN PATENT DOCUMENTS

| 0214625 | 3/1987 | European Pat. Off. . |
| 0384758 | 8/1990 | European Pat. Off. . |
| 0411674 | 2/1991 | European Pat. Off. . |
| 0411674 | 2/1991 | European Pat. Off. . |

OTHER PUBLICATIONS

International Switching Symposium 1990, Stockholm, Sweden, May 28–Jun. 1, 1990, vol. 1, pp. 111–118; K. Sallberg et al.: "A resource allocation framework in B-ISDN".
International Switching Symposium 1987, Phoenix, Ariz., Mar. 15–20, 1987, vol. 3, pp. 665–670; Y. Bretecher: "Network signalling evolution in ISDN and impacts on switching systems".
Ohnishi et al, "Flow Control Schemes and Delay/Loss Tradeoff in ATM Networks", Dec. 1988, 1609–1616, IEEE Journal on Sel. Areas of Comm.
Decina et al, "On Bandwidth Allocation to Bursty Virtual Connections in ATM Networks", 1990, pp. 844–851.

Primary Examiner—Curtis Kuntz
Assistant Examiner—Duane Kobayashi
Attorney, Agent, or Firm—Sughrue, Mion, Zinn, Macpeak & Seas

[57] ABSTRACT

An interactive call is set up by a method including the steps of: emitting a message from the terminal to the connection network defining the resources required for all of the connections and for all the periods of the call, and emitting a message from the connection network to the terminal indicating that the network possesses such resources for at least one call. During each interactive call, prior to each new period requiring different resources, and for each connection of the call, the method further includes the steps of: emitting a message from the terminal to the connection network indicating each connection that is going to be necessary during the new period and indicating the resources that will be required for the connection, emitting a message from the connection network to the terminal confirming that the resources have been reserved by the network, and storing in the terminal data to be transmitted over the connection network until the terminal receives the message. Thus, at each instant, the capacity of the resources reserved by the network for an interactive call is accurately matched to the binary bit rate to be transmitted during the call. The method is particularly applicable to telecommunications networks using the ATM technique.

4 Claims, 4 Drawing Sheets

METHOD OF MANAGING FLOWS IN A WIDEBAND INTEGRATED SERVICES DIGITAL TELECOMMUNICATIONS NETWORK

The invention relates to a method of controlling flows in a wideband integrated services digital telecommunications network, using asynchronous transfer mode (ATM).

BACKGROUND OF THE INVENTION

Such a network can be used for transmitting any type of data in the form of packets having a fixed number of bits and called "cells". These cells are transmitted asynchronously and the rate at which binary data is transmitted by each of the terminals connected to the network may be highly variable.

In such a network, flow management has two objectives:

protecting normal operation of the network by avoiding congestion regardless of the rate at which any of the terminals connected to the network may be attempting to transmit; and maximizing the number of calls that are successfully processed.

A flow management method must achieve these two objectives simultaneously, and not one to the detriment of the other, by dynamically adapting the capacity of the transmission and switching resources of the network as a function of the varying binary flow rates present on the various connections established via the network at each instant in time. Such adaptation must be performed both at the interfaces between the network and the terminals, and within the network itself. Two types of flow must be taken into account: flows at constant rates and flows at variable rates.

Binary flows at constant rates are easy to manage. It is possible to ask each user terminal setting up a call to specify the rate at which it is going to transmit data; to dimension network resources as a function of the bit rate specified by the terminal; to monitor the bit rate actually transmitted while the call is in progress; and possibly to limit said rate should it exceed the rate specified while the call was being set up.

Managing variable bit rates is more difficult. It is possible to ask each user terminal that is setting up a call to specify the maximum bit rate that it can deliver. However, to avoid tying up resource capacity that is excessive for most of the time, the network reserves resource capacity that is less than the maximum value specified by the terminal. Consequently, at certain moments, the bit rate transmitted by such a terminal exceeds the transmission and switching capacity available in the network.

Known methods of managing flows in a digital telecommunications network are defensive methods that consist in causing the network to react as a function of the flow rates actually transmitted by the terminals. The following courses of action can be taken:

storing data in queues in the nodes of the network;
explicitly rejecting a portion of the traffic; and
voluntarily allowing a portion of the data to be transmitted to be lost.

Transit time is modulated to vary the time during which data is stored in queues in the network. Such storage is naturally limited by the queue capacity. Feedback on terminals is based on the fact that a terminal can detect a limit being imposed on the bit rate transmitted by the terminal, and giving rise to a loss of data. The terminal can respond by reducing the rate at which it transmits data.

Such a defensive method is described, for example, in French patent application No. 89 1551. That known method takes account of the type of service provided by each connection in order simultaneously to optimize resource utilization and quality of service, and it consists essentially of allowing data cells to be delayed or lost within limits that are predetermined as a function of the type of service provided by the terminals connected to the connection under consideration.

Those known methods of the defensive type satisfy the objective of avoiding network congestion, but the second objective, namely maximizing the number of calls that terminate successfully, depends on the ability of the higher network layers of the user application in each terminal to tolerate the flow rate limitations imposed by the network. In traditional data transmission applications, such bit rate limitations are acceptable since such applications are relatively tolerant of changes in the transmission delay through the network. In contrast, other types of application cannot tolerate an increase in transit time or an increase in data loss during transmission through the network.

An interactive call is a variable bit rate type of call which corresponds typically to an application in which the quantity of data interchanged at various instants is determined by the user of the terminal during the call itself. A typical example of an interactive call is consulting a data base by using menus. During the call, the terminal user makes decisions concerning the nature and the quantity of data that are to be transmitted or received by the terminal, as a function of information provided by dialog with the data base. Under such circumstances, the user of the terminal cannot tell the network while a call is being set up how much resource capacity is going to be required during each period of the call. The user can only specify the type of resources that may be required and the maximum capacity thereof. However, during a call, the user can specify how much resource capacity is going to be required during the period immediately following an instant under consideration.

The object of the invention is to provide a method of managing flows that is not based on an a priori acceptance of reduced quality of service as a means of protecting the network, but which is based on predicting certain variable binary flow rates so as to adjust resource reservation as accurately as possible as a function of predicted binary flow rates.

SUMMARY OF THE INVENTION

The present invention provides a method of managing flows in a wideband integrated services digital telecommunications network comprising a plurality of terminals and a connection network:

wherein, while an interactive call is being set up between a terminal and the connection network, said call comprising a plurality of periods and requiring at least one connection constituted by respective different resources for said periods, said resources being forecastable and definable by means of at least one parameter, the method consists of:

transmitting a "declaration" message from the terminal to the connection network, said message using at least one parameter to define the resources required respectively by each of the connections and for all of the periods of said call;

transmitting an "agreement" message from the connection network to the terminal indicating that the network possesses resources complying with each of the parameters contained in the declaration message; and wherein during said interactive call, prior to each new period requiring different resources, the method consists of:

emitting a "utilization request" message from the terminal to the connection network, indicating each of the connections that is to be used during said new period and indicating at least one parameter defining the resources that will be required by said connection during said new period;

emitting a "confirmation" message from the connection network to the terminal to confirm that connections are available having resources that comply with each of the parameters indicated in the utilization request message; and storing in the terminal data for said call that is to be transmitted over the connection network until the terminal has received the confirmation message.

This method enables the connection network to allocate to a call exactly those resources which are required during each period of data transmission without uselessly reserving excess resources therefor, and consequently it provides a better solution to the problem of managing flows that relate to calls of the interactive call type.

BRIEF DESCRIPTION OF THE DRAWINGS

An implementation of the invention is described by way of example with reference to the accompanying drawings, in which.

DETAILED DESCRIPTION

Figure 1:
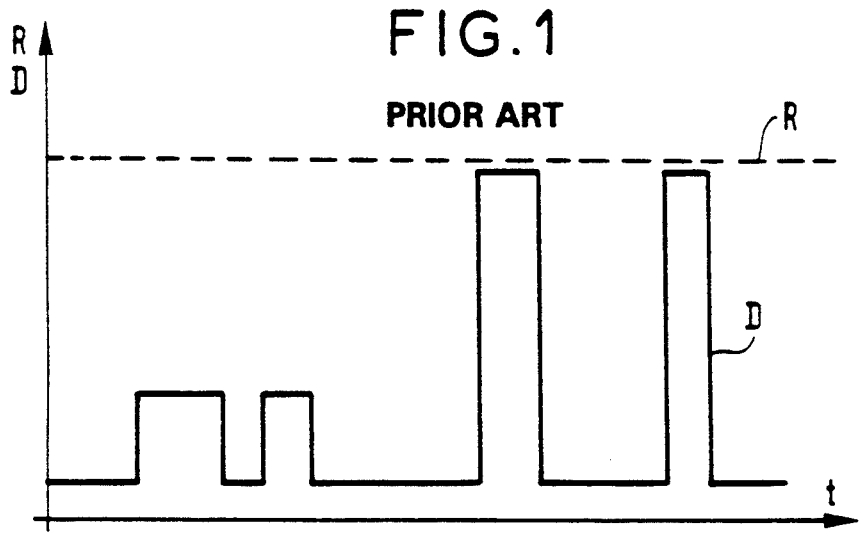
FIGS. 1, 2, and 3 are respective graphs showing the bit rate and the capacity of resources reserved for a variable bit rate call, using two prior art flow management methods and using the method of the invention.

FIG. 1 shows a known method of flow management that consists in reserving resources having a capacity that corresponds to the maximum predicted flow rate for each connection during a call. In that example, the call is an interactive call using a single connection and including periods during which the flow rate takes up three very different values. The figure is a graph D of said flow rate as a function of time t, and it also shows the capacity R of the resources reserved for the call, as a function of time. In that known method, the reserved resource capacity is constant and equal to the maximum flow rate of the call, thereby giving rise to major underuse of the resources during most of the call duration.

Figure 2:
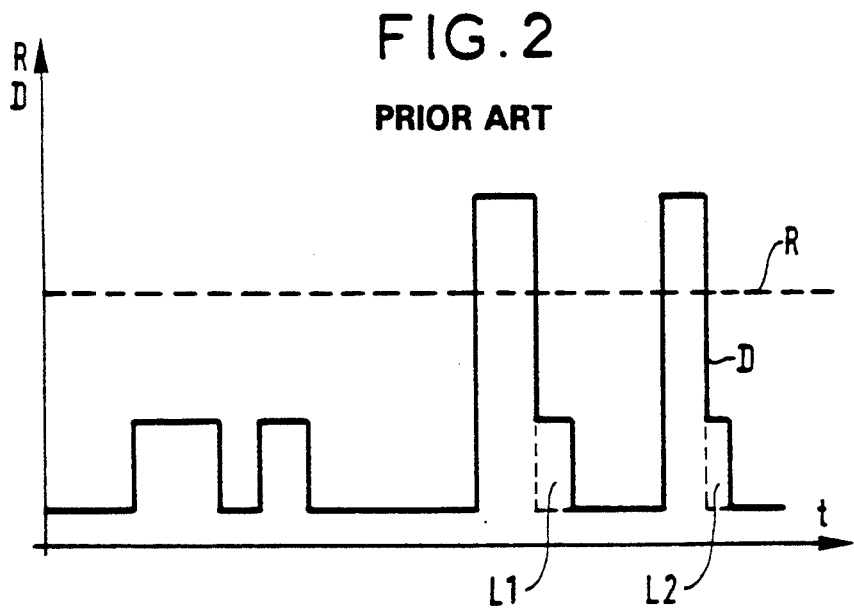

FIG. 2 shows the application of another known method which consists in reserving resources at a capacity that is always lower than the capacity which corresponds to the maximum bit rate during the call. Graph D shows the bit rate actually transmitted by the terminal over a connection, and graph R shows the capacity of the resources reserved for transmitting said bit rate. It can be seen that for most of the time the reserved resource capacity is pointlessly too great, but that during some periods it is less than the bit rate that is actually transmitted by the terminal. During these periods, a portion of the transmitted data is lost because of lack of resource capacity. The sending terminal is informed about such data loss by the terminal that receives the data, and it transmits the lost data a second time. Retransmission of lost data gives rise to the loss-including transmission periods being extended at L1 and at L2.

Figure 3:
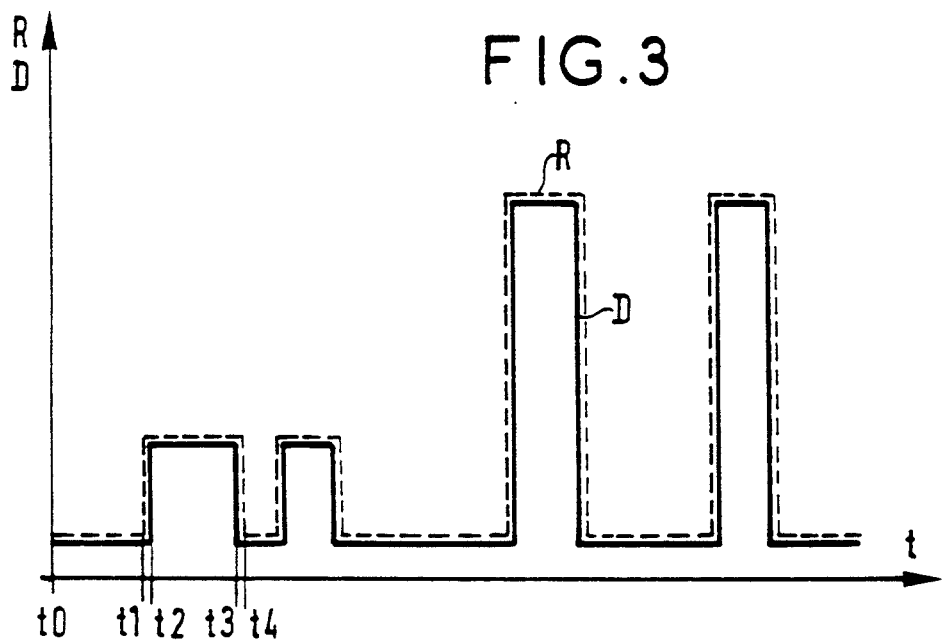

FIG. 3 shows a graph D of bit rate as a function of time t as transmitted by a terminal over a connection during an interactive call, and graph R shows the resource capacity reserved by the network during said call for conveying the data transmitted by said terminal, when applying the method of the present invention. Within each of the time periods constituting the call, the rate at which data is transmitted is constant. It can be seen that the reserved resource capacity graph R coincides throughout with the graph D of the binary bit rate to be transmitted, and as a result reserved resources are never under-used, nor are reserved resources ever insufficient to convey the binary bit rate transmitted by the terminal.

A typical example of an interactive call is consulting a medical data base. After the call has been set up, the user consults the data base to identify patients corresponding to certain selection criteria. Thereafter the user requests transfer of detailed archives concerning the selected patients, which archives may include X-ray images. The use of selection menus gives rise to a low bit rate (less than 1 Kb/s). Making use of the data base menu requires medium bit rates, of the order of 1 Mb/s to 2 Mb/s. Transferring the complete archives of each patient may require a very high bit rate, of the order of 30 Mb/s to 150 Mb/s.

Before the call is set up, the terminals knows the different capacities of the resources that may be required during different periods of such an interactive call. According to the invention, the terminal sends a declaration message at an instant t0 to the connection network prior to the call being set up. This message specifies the resource capacity required for all of the connections and for all of the periods that are going to constitute the call, even though it is not known exactly at which moments said resources are going to be necessary. The capacity of the resources constituting a connection is essentially defined by a bit rate value. In addition to bit rate, the declaration message may optionally contain an indication of the maximum error rate and of the maximum delay that can be accepted by the data to be transmitted, and also an indication of the typical volume of the data to be transmitted.

Figure 4:
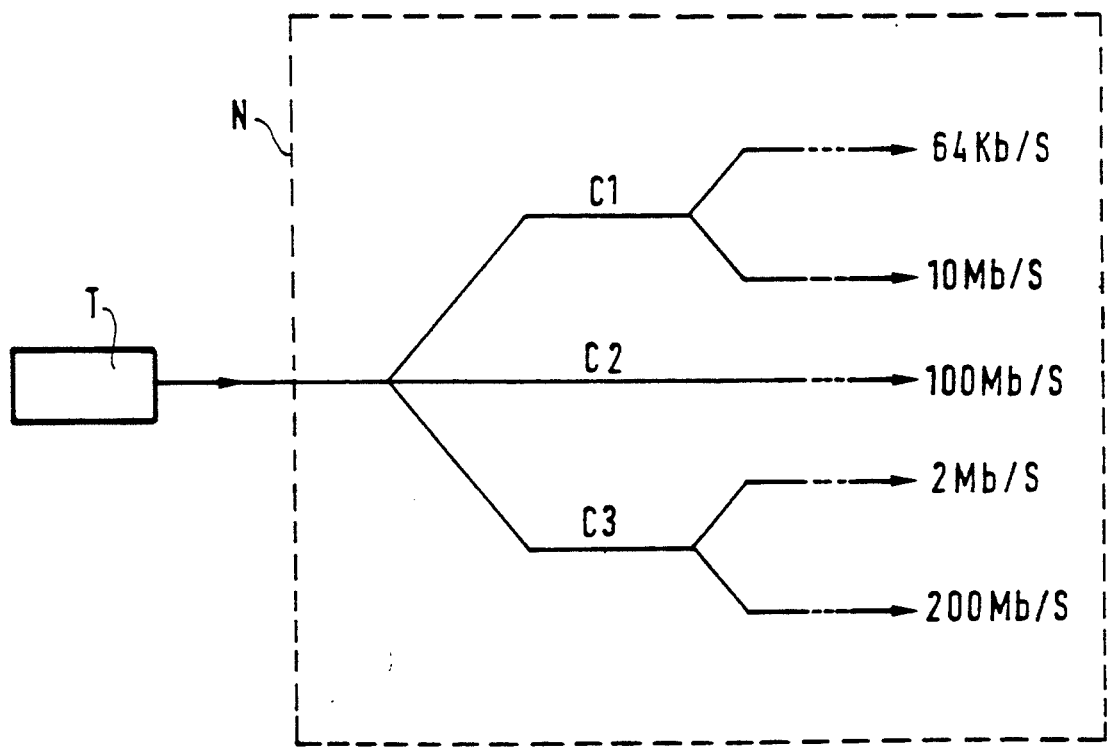
FIG. 4 shows an example of an interactive call implementing three connections capable of conveying different bit rates in different periods.

FIG. 4 is a diagram showing this step in implementing the method of the invention. A terminal T is about to set up an interactive call over a connection network N, with the call including three connections C1, C2, and C3. The connection C1 may have a bit rate of 64 Kb/s or of 10 Mb/s. The connection C2 has a fixed bit rate of 100 Mb/s. The connection C3 may have a bit rate of 2 Mb/s, or else of 200 Mb/s. The terminal T sends a declaration message to the network N specifying these three connections and their bit rate values.

Before the call is set up, the network N responds to the terminal by means of an agreement message which tells the terminal that the network possesses resources that match the parameters contained in the declaration message. The network N does not reserve these resources, it merely tells the terminal T that it possesses sufficient resources for conveying at least one call having the parameters mentioned in the declaration message. Nevertheless, the network N can immediately identify the various routes that correspond to the different resources required for the call.

During the interactive call, before each new period that requires new resources, the terminal T sends a utilization request message to the connection network N specifying which of the connections C1, C2, or C3 is going to be required during the forthcoming period, and specifying the bit rate defining the required resources for said connection during said forthcoming period.

In the example shown in FIG. 3, the utilization request message is sent at instant t1. The connection network N responds immediately with a confirmation message to confirm that connections having resources that comply with the parameters contained in the utilization request message are available. The terminal receives the confirmation message at instant t2 shortly after t1, and then begins to transmit data at a new bit rate corresponding to the new value for the capacity of the resources reserved by the connection network N. Between instants t1 and t2 the terminal T waits for the confirmation message and stores the data it is going to transmit over the connection network N in a buffer memory since said data is going to require greater capacity from the switching and transmission resources.

At instant t3, the terminal T has finished transmitting a batch of data. From now on it needs to transmit only at a much lower bit rate. It therefore sends a new utilization request message to the network N indicating each of the connections that is going to be required during the following period, and indicating new bit rate values that define the resources that will be required by said connections during said forthcoming period. At instant t4, shortly after t3, it receives a confirmation message from the connection network N confirming that connections are available made up of resources that comply with the new bit rate values. It then begins transmitting data over said new connections at said new bit rate values.

Parameters that define the resources required are declared independently for each connection used during the same call. These parameters may be included in a single declaration message or each of them be included in an independent declaration message. Similarly, during a call, the utilization request message may be independent for each of the connections that is to be reserved for the same call. A call generally interconnects a plurality of terminals, but the method of the invention is applied independently for the data transmitted by each of the (two) terminals, in other words the declaration, utilization request, and confirmation messages are totally independent for the two transmission directions between two terminals interconnected in the same call.

The signaling protocol which is used for managing resources of the network N in this way is situated at a layer higher than the conventional signalling layer of an asynchronous mode transfer network, said signalling being entirely transparent for said conventional signalling layer. Said special signalling for resource management is faster than conventional signalling which normally takes 100 ms, which is unacceptable for implementing the method of the invention. The way in which this particular signalling protocol is implemented is within the competence of the person skilled in the art.

Figure 5:
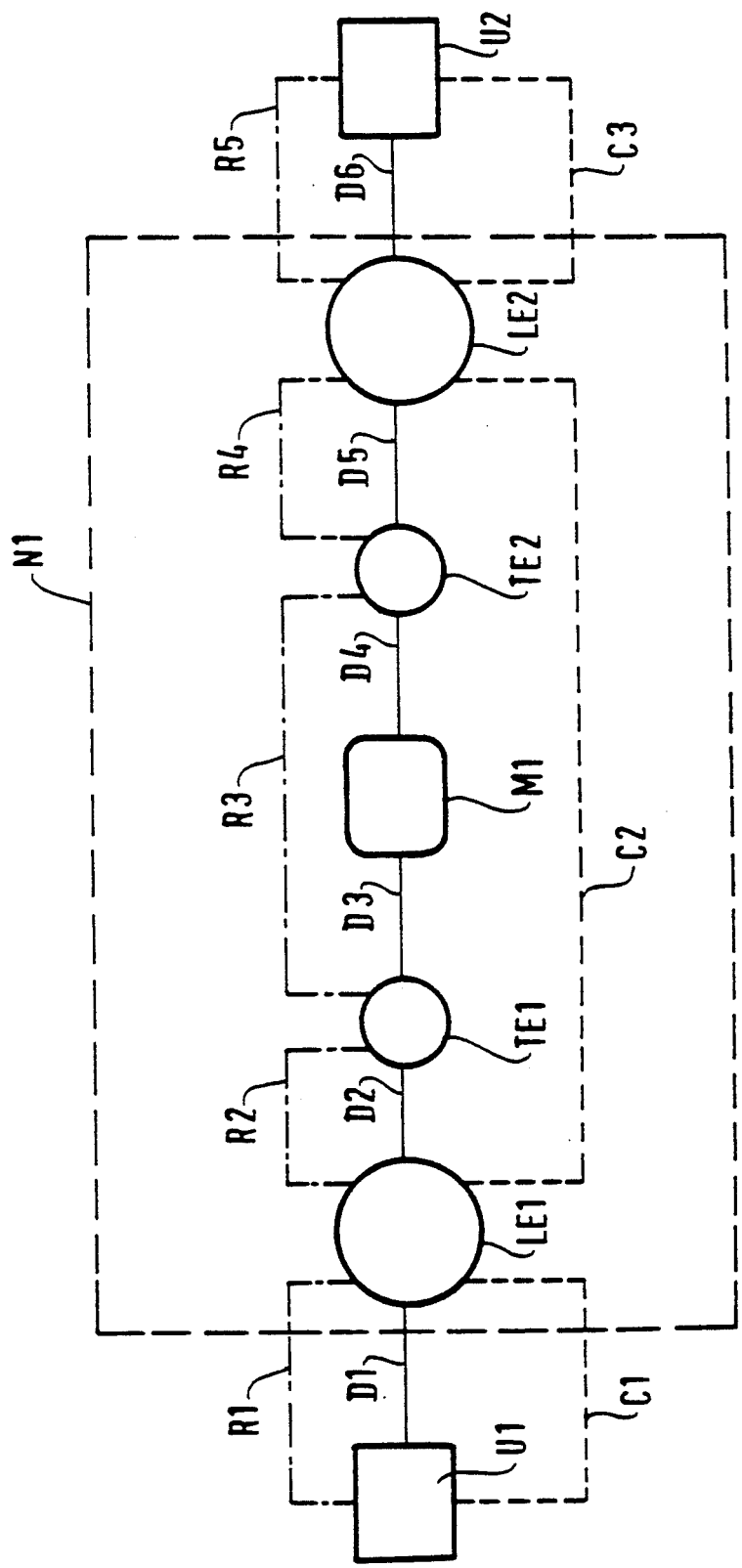
FIGS. 5 and 6 show the paths followed by data and by signalling messages for one particular implementation of the method of the invention, respectively for an interactive call that requires a single connection and for an interactive call that requires three connections.

FIG. 5 shows the paths followed by signalling messages and data messages while the method of the invention is being implemented for an interactive call that requires a single connection. The terminal U1 of a user is connected to the terminal U2 of another user via a connection network N1. In this example, the call is conveyed via a local exchange LE1, a transit exchange TE1, a cross-connect center M1, a transit exchange TE1, and a local exchange LE2. Data follows a path D1, D2, D3, D4, D5, and D6, and passes through each of the above nodes. The signalling relating to resource management follows the path R1, R2, R3, R4, and R5 which passes through the nodes LE1, TE1, TE2, and LE2, but which does not pass through the cross-connect center M1. Conventional signalling relating to call handling follows the path C1, C2, and C3 and passes solely through the local exchanges LE1 and LE2.

Figure 6:
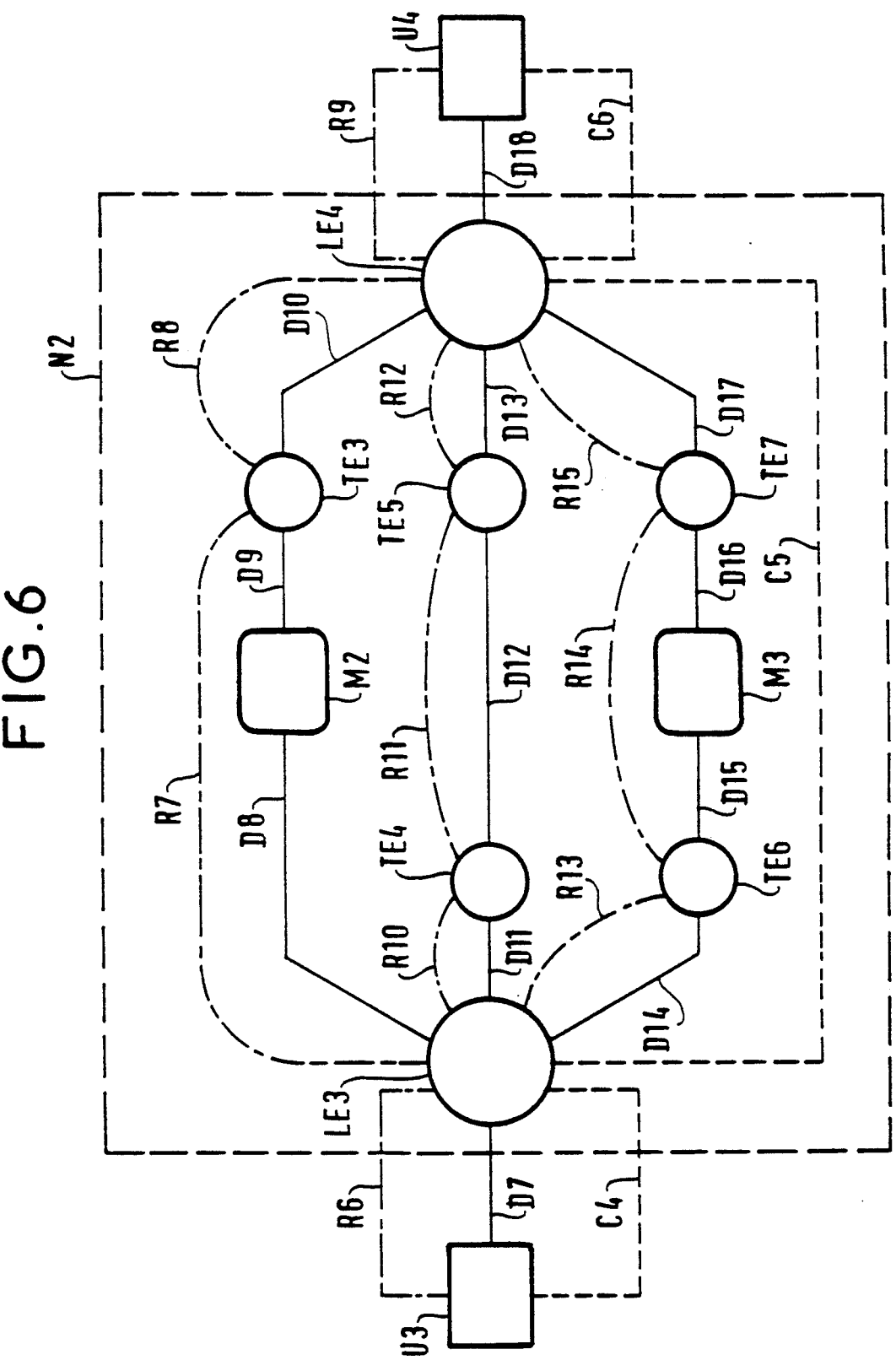

FIG. 6 shows the paths followed by data and by signalling messages for an interactive call that requires three distinct connections. This call connects the terminal U3 of a user to the terminal U4 of another user via a connection network N2. In this example, the nodes used in the connection network N2 for a first connection are: a local exchange LE3, a cross-connect center M2, a transit exchange TE3, and a local exchange LE4. The nodes used in the connection network N2 for the second connection are: the local exchange LE3, two transit exchanges TE4 and TE5; and the local exchange LE4. The nodes used in the connection network N2 for the third call are: the local exchange LE3, a transit exchange TE6, a cross-connect center M3, a transit exchange TE7, and the local exchange LE4.

Between the terminal U3 and the local exchange LE3, data follows a single path D7 regardless of which connection is in use, and the signalling relating to managing resources follows a single path R6, while the signalling relating to call handling follows a single path C4, for all of the connections.

For the first connection, the data follows a path D8, D9, and D10 going from the local exchange LE3 to local exchange LE4 via the cross-connect center M2 and the transit exchange TE3, while the signalling relating to resource management follows a path R7, R8 passing solely through the transit exchange TE3. For the second connection, the data follows a path D11, D12, and D13 going from the local exchange LE3 to the local exchange LE4 via the transit exchanges TE4 and TE5, while the signalling relating to resource management follows a path R10, R11, and R12 passing via the same transit exchanges TE4 and TE5. For the third connection, the data follows a path D14, D15, D16, and D17 going from the local exchange LE3 to the local LE4 via the transit exchange TE6, the cross-connect center M3, and the transit exchange TE7; while the signalling relating to resource management follows a path R13, R14, and R15 passing solely though the transit exchanges TE6 and TE7. The conventional signalling relating to call handling follows a path C5 going directly from the local exchange LE3 to the local exchange LE4.

From the local exchange LE4 to the terminal U4, the call follows a single path D18 for data, R9 for signalling relating to resource management, and C6 for signalling relating to call handling, regardless of which connection is being used.

I claim:

1. A method of managing flows in a wideband integrated services digital telecommunications network comprising a plurality of terminals and a connection network:

wherein, while an interactive call is being set up between a terminal and the connection network, said interactive call comprising a plurality of periods and requiring at least one connection constituted by respective different resources for said plurality of periods, said resources being forecastable and definable by means of at least one parameter, the method comprises the steps of:

transmitting a declaration message from the terminal to the connection network, said declaration message using at least one parameter to define resources required respectively by each of the connections and for all the plurality of periods of said interactive call;

transmitting an agreement message from the connection network to the terminal indicating that the connection network possesses resources complying with each parameter contained in the declaration message; and wherein, during said interactive call, prior to each new period requiring different resources, the method comprises the steps of:

emitting a utilization request message from the terminal to the connection network, indicating each connection that is to be used during said new period and indicating at least one parameter defining the resources that will be required by said connection during said new period;

emitting a confirmation message from the connection network to the terminal to confirm that connections are available having resources that comply with each parameter indicated in the utilization request message; and storing in the terminal data for said interactive call that is to be transmitted over the connection network until the terminal has received the confirmation message.

2. A method according to claim 1, wherein the parameter contained in the declaration message is a bit rate of data to be transmitted over a connection.

3. A method according to claim 1, wherein the parameter contained in the declaration message is a maximum delay that can be accepted for the data to be transmitted over a connection.

4. A method according to claim 1, wherein the parameter contained in the declaration message is a maximum binary error rate that can be accepted by the data to be transmitted over a connection.

* * * * *